United States Patent
Curtindale et al.

[19]

[11] Patent Number: 6,076,885
[45] Date of Patent: *Jun. 20, 2000

[54] SPEAKER SUPPORT BAR FOR USE ABOVE VEHICLE HEADLINER

[75] Inventors: Edward C. Curtindale, Farmington Hills; Anthony J. Finocchio, Macomb, both of Mich.

[73] Assignee: Lear Automotive Dearborn, Inc., Southfield, Mich.

[ * ] Notice: Under 35 U.S.C. 154(b), the term of this patent shall be extended for 116 days.

[21] Appl. No.: 08/604,026

[22] Filed: Feb. 20, 1996

[51] Int. Cl.⁷ ........................................... B60J 3/02
[52] U.S. Cl. ............................................ 296/214; 181/141
[58] Field of Search .................... 296/214, 78.1; 181/141, 150; 381/86, 205; 362/74

[56] References Cited

U.S. PATENT DOCUMENTS

| | | | |
|---|---|---|---|
| 3,268,229 | 8/1966 | Funk . | |
| 4,005,761 | 2/1977 | Okamoto et al. | 181/141 |
| 4,056,165 | 11/1977 | Okamoto et al. | 181/141 |
| 4,099,026 | 7/1978 | Persson et al. | 179/1 VE |
| 4,100,372 | 7/1978 | Hypolite | 179/1 G |
| 4,484,658 | 11/1984 | Grote | 181/150 |
| 4,673,056 | 6/1987 | Koppelomaki | 181/141 |
| 4,891,842 | 1/1990 | Green | 381/188 |
| 4,913,484 | 4/1990 | Dowd et al. | 296/214 |
| 4,923,032 | 5/1990 | Nuernberger | 181/150 |
| 5,094,316 | 3/1992 | Rosen | 381/141 |
| 5,414,229 | 5/1995 | Rocheleau et al. | 181/150 |
| 5,465,200 | 11/1995 | Finocchio et al. | 362/74 |
| 5,565,659 | 10/1996 | Moner, Jr. et al. | 181/150 |
| 5,606,623 | 2/1997 | Bahm, III et al. | 381/86 |

FOREIGN PATENT DOCUMENTS

| | | |
|---|---|---|
| 2344423 | 3/1977 | France . |
| 2571008 | 10/1984 | France . |
| 3028985 | 7/1982 | Germany . |
| 3603198 | 10/1986 | Germany . |
| 4413626 | 11/1994 | Germany . |
| 7603422 | 4/1978 | Sweden . |
| 1151734 | 5/1969 | United Kingdom . |

*Primary Examiner*—David M. Mitchell
*Attorney, Agent, or Firm*—MacMillan, Sobanski & Todd, LLC

[57] ABSTRACT

A speaker support bar supports a pair of speakers above a vehicle headliner. The speaker support bar is positioned vertically above the headliner, and thus the uniform appearance of the headliner is preserved. The speaker support bar extends between lateral support ends which transfer the weight of the speakers to the headliner over a wide area, and near the vehicle frame. Thus, the headliner is able to support the weight of the speakers. The invention also facilitates the pre-assembly of the headliner and its sound system prior to attachment of the headliner to the vehicle.

4 Claims, 1 Drawing Sheet

SPEAKER SUPPORT BAR FOR USE ABOVE VEHICLE HEADLINER

BACKGROUND OF THE INVENTION

This invention relates to a speaker support bar that provides a rigid mount for a pair of speakers above a vehicle headliner.

Headliners provide interior trim on the ceiling of vehicles. Typically, headliners are made from a relatively non-rigid material. Headliners thus do not have the ability to support a heavy load. More recently, there has been emphasis on reducing the weight and cost of the headliner, thus, even further reducing its ability to support loads.

Speakers for vehicle sound systems have typically been mounted in door panels, or the rear deck of a vehicle. Speakers have been mounted in the ceiling of a vehicle only in a few narrow applications. For the most part, the known attempts to mount speakers in the ceiling of a vehicle have required a rigid support structure beneath the headliner, and extending into the passenger compartment. These support structures detract from the otherwise uniform appearance of a headliner, and thus, are undesirable.

Moreover, the prior art speaker supports have typically required assembly at the vehicle assembly line separate from the headliner. Vehicle manufacturers would like to increase flexibility in the number of assembly steps that occur at a vehicle assembly line. Thus, modular constructions that may be pre-assembled at a supplier location and then shipped as an assembled unit to the vehicle assembly line are desirable. Typically, the prior art speaker supports have not facilitated pre-assembly of a vehicle ceiling sub-assembly.

SUMMARY OF THE INVENTION

In a disclosed embodiment of this invention, a relatively rigid speaker support bar is provided above a headliner. The speaker support bar has a central portion with two support legs at outer lateral ends that spread the weight of the speakers over a large area on the headliner. The speaker support bar preferably supports a pair of speakers. Speakers are mounted within the headliner by attachment members attached directly to the speaker support bar. The headliner appearance remains uniform other than the speaker covers.

When the headliner is supported within the vehicle, the speaker support bar rests on the headliner adjacent the location where the headliner is supported on the frame of the vehicle. Thus, the weight is more easily transferred to the frame of the vehicle, increasing the headliner's capacity to bear the load. Moreover, since the speaker support bar spreads the weight of the speakers over a greater area on the headliner, the headliner is also able to support greater loads.

The speaker support bar allows a vehicle headliner to be pre-assembled, and then attached at the vehicle assembly line as a single sub-assembly. Speakers and any other accessories such as sun visors, lamps, etc., are pre-mounted to the headliner. The fully assembled headliner may then be attached as a unit to the vehicle ceiling. This facilitates manufacturing freedom in selecting the location of the assembly steps.

In a method of assembling a vehicle headliner, speakers are attached to a headliner through the speaker support bar. The speaker support bar is on a non-exposed surface of the headliner, and the speakers extend through the headliner to the exposed surface of the headliner. The pre-assembled headliner speaker and speaker support bar is then attached to a vehicle. Other accessories such as lamps, visors, etc., may also be pre-assembled to the headliner before the assembled headliner is attached to the vehicle.

Specific applications of this inventive structure are disclosed in co-pending application Ser. No. 08/603 136, entitled "Speaker Sound Bar and Sound Chamber Above Vehicle Headliner".

These and other features of the present invention will be best understood from the following specification and drawings, of which the following is a brief description.

DETAILED DESCRIPTION OF A PREFERRED EMBODIMENT

Figure 1:
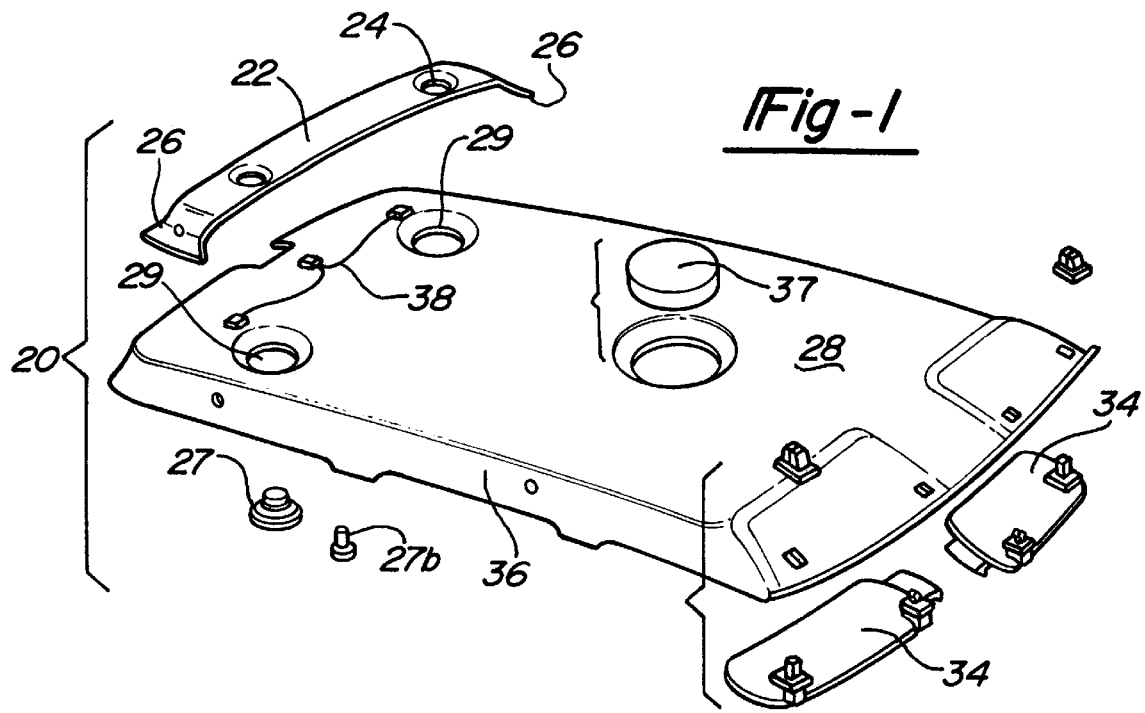
FIG. 1 is an exploded view of a first embodiment headliner and speaker support system.

FIG. 1 shows headliner 20, with a speaker support bar 22. As is known, headliner 20 includes a non-exposed face shown in this figure, and a trim face, not shown in this figure that faces into the plane of this figure. The speaker support bar 22 includes speaker mount locations 24, and two laterally spaced lateral support ends 26. Speakers 27 are mounted to each mount location 24, by bolts 27b or other attachment structure. The lateral support ends support the weight of the speaker on the upper surface 28 of the headliner 20. As can be seen in this figure, the speaker support bar is mounted towards a rear end of the headliner 20. Openings 29 in the headliner 20 receive speakers 27.

Openings 30 in the headliner 20 may receive a lamp 37. The headliner 20 also typically includes other accessories such as visors 34.

The laterally outer edges 36 of the headliner 20 slope vertically downwardly from a central portion of the headliner. The support ends 26 also slope vertically downwardly to press on those outer edges of the headliner. Thus, the lateral support ends are the vertically lowermost part of the speaker support bars, and are spaced vertically downwardly from the speaker mount locations 24.

Figure 2:
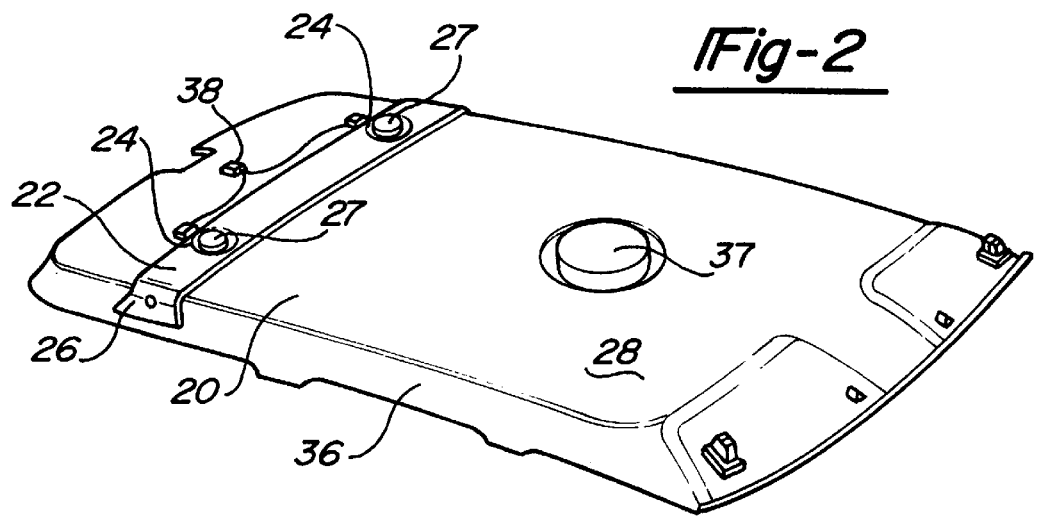
FIG. 2 is an assembled view of the system shown in FIG. 1.

As shown in FIG. 2, an entire headliner assembly has now been pre-assembled. Support ends 26 rest on outer edges 36. Due to the unique speaker support bar 22, the entire speaker system may be incorporated into the headliner 20 prior to delivery to the vehicle assembly location. The workers at the vehicle assembly location now merely must connect an electrical wire harness to harness 38, and then can mount the headliner 20 within the vehicle. This reduces the number of constraints on the vehicle assembly line.

Figure 3:
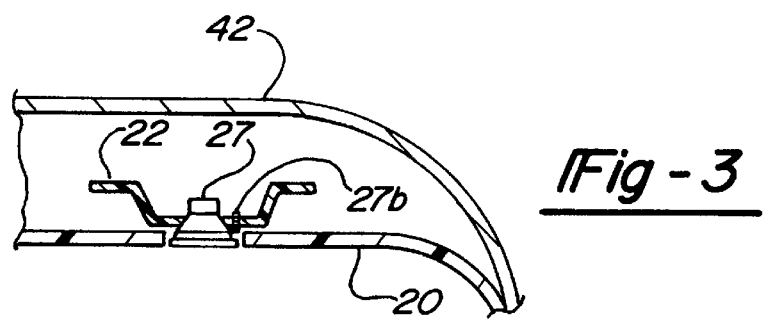
FIG. 3 is a schematic cross-sectional view through a vehicle.

As shown in FIG. 3, headliner 20 is attached to a vehicle frame 42. Speaker support bar 22 has a speaker 27 mounted by bolts 27b to a speaker mount location 24. The weight from the speakers is transferred to the headliner through the support ends 26, adjacent the outer edges 36 of the headliner, as can be appreciated from FIG. 2.

In a method of utilizing the inventive system, the headliner is first pre-assembled as shown in FIG. 2 to include the speakers, the speaker support bar 22 and any other accessories. The pre-assembled headliner is then attached to the vehicle. The vehicle accessory supplier may thus supply a pre-assembled headliner to the vehicle assembly line. The vehicle assembler merely connects the wire harness and then attaches the entire headliner to the vehicle. Thus, freedom in the location and order of manufacturing steps is improved.

Due to the unique speaker support bar, the speakers are supported above the headliner, and yet the headliner is able to bear the weight of the speakers since it is spread over a relatively large area. Moreover, since the weight is transferred to the headliner adjacent the vehicle frame, the headliner is better equipped to bear the load.

The speaker support bars are preferably molded from a suitable plastic. One acceptable material is a polycarbonate available from GE Plastics under the trade name Lexan 101. The headliner is formed of standard headliner material. The support bar is relatively more rigid than the headliner, which is relatively flexible when compared to the speaker support bar.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A vehicle headliner assembly comprising:

a headliner extending between longitudinally forward and rear positions and laterally spaced lateral ends, said headliner having a first trim face to be exposed when said headliner is mounted to a vehicle, and a second non-exposed face vertically above said exposed face when said headliner is mounted in a vehicle, and speaker openings formed through said headliner;

a speaker support bar positioned above said non-exposed face of said headliner, said speaker support bar having speaker mount locations aligned with said speaker openings through said headliner, said speaker mount locations including mounting structure to mount a speaker, and said speaker support bar having spaced support ends for contacting said headliner at spaced locations, and transferring weight to said headliner; and speakers extending through said speaker openings in said headliner, and being mounted to said speaker mount location on said speaker support bar.

2. A headliner as recited in claim 1, wherein said speakers extend through said speaker support bar, such that a portion of each of said speakers is mounted above a central portion of said speaker support bar, and another portion of said speaker is mounted below said speaker support bar.

3. A speaker support system in the ceiling of a vehicle comprising:

a vehicle frame defining an upper end for said system;

a headliner extending between longitudinally forward and rear ends and laterally spaced ends, said headliner being attached to said vehicle frame, said headliner being spaced vertically below said vehicle frame, a pair of speaker openings extending through said headliner;

a speaker support bar positioned vertically between said headliner and said vehicle frame, said speaker support bar having a pair of speaker mount locations, and a pair of spaced support ends, said support ends contacting said headliner; and speakers received in said speaker openings in said headliner, the weight of said speakers being transferred to said headliner by said support ends.

4. A speaker support system as recited in claim 3, wherein said speakers extend through said speaker support bar, such that a portion of each of said speakers is mounted above a central portion of said speaker support bar, and another portion of said speaker is mounted below said speaker support bar.

* * * * *